United States Patent [19]
Soper et al.

[11] Patent Number: 6,039,901
[45] Date of Patent: Mar. 21, 2000

[54] ENZYMATICALLY PROTEIN ENCAPSULATING OIL PARTICLES BY COMPLEX COACERVATION

[75] Inventors: Jon C. Soper, Lebanon; M. Teresa Thomas, Centerville, both of Ohio

[73] Assignee: Givaudan Roure Flavors Corporation, Cincinnati, Ohio

[21] Appl. No.: 08/791,953

[22] Filed: Jan. 31, 1997

[51] Int. Cl.[7] .................................................. B01J 13/10
[52] U.S. Cl. ...................... 264/4.3; 264/4.33; 428/402.2; 428/402.21
[58] Field of Search ........................... 264/4.3, 432, 4.33; 428/402.2, 402.21

[56] References Cited

U.S. PATENT DOCUMENTS

| | | |
|---|---|---|
| 2,800,457 | 7/1957 | Green et al. . |
| 2,800,458 | 7/1957 | Green et al. . |
| 3,341,466 | 9/1967 | Brynko et al. . |
| 3,639,259 | 2/1972 | Scarpelli ................................ 435/68.1 |
| 3,692,690 | 9/1972 | Horger . |
| 4,308,165 | 12/1981 | Vassiliades et al. . |
| 4,386,106 | 5/1983 | Merritt et al. . |
| 4,464,434 | 8/1984 | Davis . |
| 4,515,769 | 5/1985 | Merritt et al. . |
| 4,908,233 | 3/1990 | Takizawa et al. . |
| 4,917,904 | 4/1990 | Wakameda et al. . |
| 5,004,595 | 4/1991 | Cherukuri et al. . |
| 5,023,024 | 6/1991 | Kyogoku et al. . |
| 5,093,028 | 3/1992 | Kyogoku et al. . |
| 5,143,737 | 9/1992 | Richardson ................................. 426/2 |
| 5,145,702 | 9/1992 | Stark et al. ............................... 426/531 |
| 5,156,956 | 10/1992 | Motoki et al. . |
| 5,252,469 | 10/1993 | Andou et al. . |
| 5,266,335 | 11/1993 | Cherukuri et al. . |
| 5,271,961 | 12/1993 | Mathiowitz et al. ............... 427/213.31 |
| 5,418,010 | 5/1995 | Janda et al. ........................ 427/213.31 |
| 5,424,081 | 6/1995 | Owusu-Ansah et al. . |
| 5,458,891 | 10/1995 | D'Amelia et al. . |
| 5,498,439 | 3/1996 | Bonner . |
| 5,518,742 | 5/1996 | Soeda et al. ............................... 426/63 |
| 5,536,513 | 7/1996 | Graf et al. . |
| 5,543,162 | 8/1996 | Timonen et al. . |

FOREIGN PATENT DOCUMENTS

| | | |
|---|---|---|
| 0455598 | 4/1991 | European Pat. Off. . |
| 58-28234 | 2/1983 | Japan . |
| 58-149645 | 6/1983 | Japan . |
| 6427471 | 1/1989 | Japan . |
| 343080 | 2/1991 | Japan . |
| 5292899 | 11/1993 | Japan . |
| 6113844 | 4/1994 | Japan . |
| 8900011 | 1/1989 | WIPO . |

OTHER PUBLICATIONS

Inoue et al., WPIDS AN 97–343,854, abstracting IEP 782883 A2, Jul. 1997.
Ajinomoto Co's Transglutaminase (TG) brochure, Product Literature of Ajnomoto Co. (date unavailable).

*Primary Examiner*—Jeffrey C. Mullis
*Attorney, Agent, or Firm*—Wood, Herron & Evans, L.L.P.

[57] ABSTRACT

Enzymatic cross-linking of protein-encapsulated oil particles by complex coacervation. A complex coacervate of oil particles, each encapsulated in a protein shell, is stabilized by gelling the protein shell and is subsequently enzymatically cross-linked to form thermostable capsules of about 100–300 microns. The preferred enzyme is transglutaminase, and the reaction is performed at pH 7 to achieve the optimal cross-linking rate. The transglutaminase-catalyzed cross-linking reaction takes place with the complex coacervate maintained at a temperature in the range of about 5° C.–10° C. to maintain the structural stability of the complex coacervate.

21 Claims, 2 Drawing Sheets

ENZYMATICALLY PROTEIN ENCAPSULATING OIL PARTICLES BY COMPLEX COACERVATION

FIELD OF THE INVENTION

This invention relates to protein-encapsulating oil particles by complex coacervation, and more particularly to enzymatic cross-linking of the protein-encapsulating shell.

BACKGROUND OF THE INVENTION

Coacervation is the process by which an aqueous solution of a macromolecular colloid is separated into two liquid phases. One liquid phase, called the coacervate, is composed of many tiny colloid-rich droplets that are bound together. The other liquid phase, called the equilibrium liquid, is an aqueous solution of the coacervating agent.

When two or more oppositely-charged macromolecular colloids are used to form the coacervate, the process is termed complex coacervation. Colloids that bear a positive charge include gelatin and agar; colloids that bear a negative charge include carboxymethylcellulose and gum arabic. Depending upon each colloid's isoelectric point, dilution with water and/or adjustment of pH may be necessary for the particular colloids to be oppositely charged. These reactions must occur at a temperature above the gelling temperature for either colloid, otherwise the colloids will not be in a liquid phase and coacervation will not occur. When coacervation occurs in an environment that contains oil particles, the oil particles act as nucleating agents and the protein colloids deposit as a shell-like structure around each oil particle.

Encapsulating oil particles in the process of complex coacervation is well known in the prior art. U.S. Pat. No. 2,800,457 discloses oil-containing microscopic capsules and method of making them by complex coacervation. The '457 patent teaches dispersing a colloid in water, introducing an oil, forming an emulsion, dispersing a second colloid in water and mixing with the emulsion, and adjusting the pH and/or diluting with water to form a complex coacervate, all at a temperature above a gel point of the colloids, then cooling to cause a gel to form, followed by optional steps of hardening and cross-linking with formaldehyde or an equivalent. In one embodiment, gum arabic and gelatin are used to form a shell-like film of colloid material around an oil nucleus. Once the coacervate is formed, the mixture is allowed to stand for an hour at not over 25° C., after which time the formation of capsules is complete. The capsules may then be used as desired or may undergo the optional hardening step. U.S. Pat. No. 2,800,458 similarly discloses a method for making oil-containing microcapsules. The '458 patent discloses the use of a salt solution to form the coacervate, while the '457 patent discloses either altering pH or diluting with water to form the coacervate.

Cross-linking of the protein shell of the complex coacervate renders the protein-encapsulated oil thermostable, since a protein containing cross-links is a stable structure. The use of known chemical cross-linking agents, such as formaldehyde or glutaraldehyde, to irreversibly cross-link the oil-containing capsules is disclosed in the prior art. Other cross linking agents such as tannic acid (tannin) or potassium aluminum sulfate (alum) are similarly known. The optional hardening step disclosed in both the '457 patent and the '458 patent consists of adjusting a suspension of capsular material to pH 9 to 11, cooling to 0° C. to 5° C., and adding formaldehyde.

Formaldehyde and glutaraldehyde, while effective chemical cross-linking agents, are toxic. Thus, oil capsules that have been cross-linked using such chemicals cannot be used for oils that may be applied to or ingested within a mammalian body without accounting for the toxicity. This severely limits the applications for such products.

Certain naturally-occurring enzymes are also good cross-linking agents. Such enzymes work by catalyzing the formation of bonds between certain amino acid side chains in proteins. In addition, because the enzymes are naturally occurring, encapsulated oils that are enzymatically cross-linked do not suffer from the problems inherent with formaldehyde and glutaraldehyde cross-linking, and hence may be ingested or applied without concern about the toxicity of the cross-linking agent. Because cross-linking is a enzyme catalyzed reaction, however, the proper environmental conditions must exist for optimum enzyme activity.

An enzyme that catalyzes protein cross-linking is transglutaminase (amine γ-glutamyl transferase, EC 2.3.2.13). Transglutaminase catalyzes an acyl transfer reaction between γ-carboxamide groups of glutamine residues in a peptide and various primary amines, frequently ε-amino groups of peptide-bound lysine residues. The result is a bond or cross-linkage between a glutamine residue in one protein molecule and a lysine residue in another protein molecule. For optimal activity, transglutaminase requires a divalent metal ion, usually calcium or magnesium, as a cofactor and a pH of around 7.

Japanese patent publication 5-292899 to Ajinomoto Inc. discloses the use of transglutaminase as a cross-linking agent in preparing microcapsules. The structure taught in that publication, however, is not believed to be a complex coacervate as defined by those skilled in the art. It is, rather, an enzyme-modified gelatin emulsion. Additionally, the 5-292899 publication discloses cross-linking at elevated temperatures. Molecular and/or particulate structures maintained at elevated temperatures are more fluid and less stable, resulting in cross-linking a molecule or particles of undefined structure. The Ajinomoto publication "Ajinomoto Co.'s Transglutaminase (TG)" discloses optimum cross-linking conditions for transglutaminase at pH 6–7 and elevated temperatures of 50° C.

SUMMARY OF THE INVENTION

This invention relates to a method of enzymatically protein-encapsulating oil particles by complex coacervation. According to this method, a complex coacervate is first formed and then stabilized by gelling a protein shell around discrete particles of oil. The protein shell of the stabilized protein-encapsulated particles is then cross-linked with an enzyme to provide thermostable microparticles.

The method also achieves a number of advantages over the prior techniques. The method produces microcapsules having defined structures and sizes which have diverse properties for different end uses. For example, flavor oils that are in protein-encapsulated particles ranging from approximately 100 to approximately 300 microns are sized to both provide a significant flavor burst upon chewing and to enable processing in food applications. While particle sizes greater than 300 microns may be formed, such larger particles are not as amenable to the spraying, extruding, and other mechanical shearing forces required in many food applications. Additionally, protein-encapsulated flavor oil particles are thermostable and can withstand baking, frying, and microwaving.

In one preferred method of this invention, a coarse emulsion is first formed between the oil and the colloid dispersion of two oppositely charged colloids. A complex coacervate is then formed with a protein shell around discrete oil particles. The discrete particles are cooled to gel the surrounding protein shell. The protein shell surrounding the discrete particles is then enzymatically cross-linked at low temperatures to form microcapsules of oil. It has been found that at low temperatures of about 20° C. to about 27° C., especially at 5° C. to 10° C., enzymatic cross-linking can be achieved for protein shells of fish and beef gelatins to provide the microcapsules of flavor oils. Furthermore, the cross-linking reaction at such low temperatures is not pH dependent. Thus, a wide pH range of about 2 to about 10 or more may be utilized, which broadens the number and types of enzymes which may be employed.

In a preferred form of the invention, transglutaminase is employed to enzymatically cross-link the protein shell at a pH of about 7 over a temperature range of about 5° C. to about 10° C. Processing times and quantities of microencapsulated oils may be economically achieved for commercial purposes according to the preferred modes of operation.

The objectives and other advantages of this invention will be further understood with reference to the following figures, detailed description, and example.

DETAILED DESCRIPTION

Figure 1:
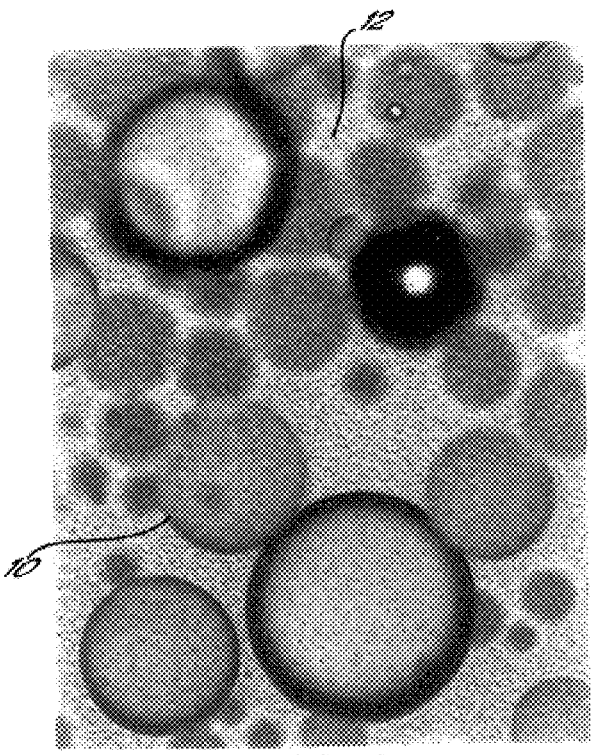
FIG. 1 is a photomicrograph at 100× magnification of pre-emulsion oil particles and colloids.

With reference to FIG. 1, an oil (10) is agitated with a colloid dispersion (12) of at least one positively charged protein colloid and at least one negatively charged colloid to form a coarse emulsion. In a preferred embodiment, the positively charged protein colloid is either gelatin or agar, and the negatively charged colloid is either carboxymethylcellulose, sodium hexametaphosphate, gum arabic, or a combination thereof. When gelatin is used, an amount of 10% by weight is preferred. A coarse emulsion of particles ranging in size from about 100 microns to about 2,000 microns is formed.

Figure 2:
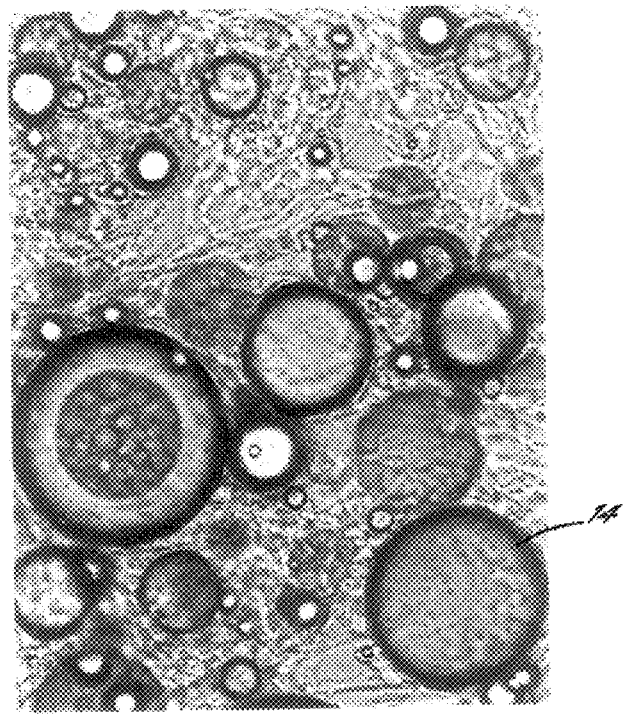
FIG. 2 is a photomicrograph at 100× magnification of a complex coacervate formed by aqueous dilution.

As shown in FIG. 2, a complex coacervate (14) is formed at ambient temperature by aqueous dilution of the colloid/oil emulsion. Depending on the isoelectric point of the protein colloid, adjusting the pH of the colloid/oil emulsion may be used to form the complex coacervate.

Figure 3:
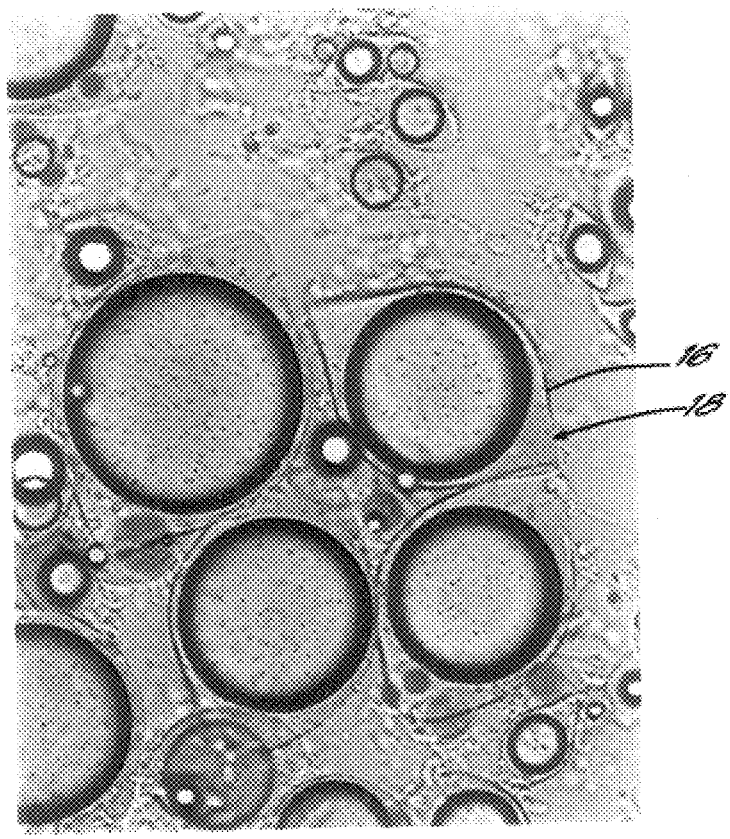
FIG. 3 is a photomicrograph at 100× magnification of protein-encapsulated oil particles formed by slow cooling to about 27° C. of a complex coacervate.

The complex coacervate (14) is cooled to a temperature at or below a gel point of the colloids. With reference to FIG. 3, cooling is performed sequentially by cooling first to a temperature sufficient for the protein to deposit around each oil particle (10) in a football-shaped protein shell (16), then further cooling to stabilize the protein shell (16). As an alternative to cooling, the protein may be denatured to stabilize the protein shell (16). While stabilization of the shell may be achieved in different ways, cooling is preferred and a distinct football-shaped protein shell (16) forms around the oil (10). The extent of initial cooling depends upon the gel point of the particular protein in the complex coacervate. For example, the gel point of fish gelatin is about 20° C., while the gel point of beef gelatin is about 27° C. Thus, depending upon the gelatin source, initial cooling would be to a temperature between 20° C. and 27° C. The initial cooling is performed at a rate of approximately 1° C. per five minutes. After initial cooling which deposits a football-shaped protein shell (16) around the oil droplet (10) the protein-encapsulated oil particles (18) are further cooled to a temperature in the range of approximately 5° C.–10° C. They are maintained at 5° C.–10° C. for a sufficient time to stabilize the protein shell (16).

Figure 4:
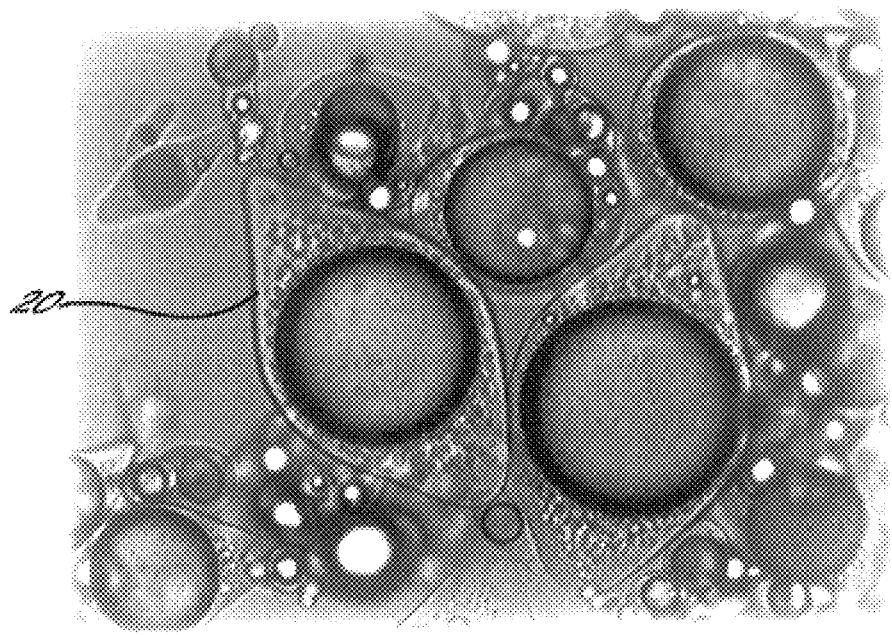
FIG. 4 is a photomicrograph at 100× magnification of enzymatically protein-encapsulated oil particles in a finished state at about 5° C.

As shown in FIG. 4, the cooled football-shaped protein shell (16) is enzymatically cross-linked at 5° C.–10° C. to form a thermostable protein shell (20). Transglutaminase is the preferred enzyme. It may be obtained from naturally occurring sources, chemically synthesized, or produced using recombinant DNA methods. Transglutaminase is added to the complex coacervate in solution with a carrier such as dextrin, sodium caseinate, or sugar. The amount of transglutaminase is about 1% to about 10% by weight. The amount of carrier may be about 99% to about 90% by weight. A divalent metal ion, preferably calcium or magnesium, is also present as a cofactor. Only very minimum amounts of calcium are needed and such are normally present in the natural source of tissue for transglutaminase. Alternatively, the ion may be added when needed to accelerate the cross-linking reaction. Since transglutaminase exhibits optimal activity at pH 7, the complex coacervate is adjusted to a pH of about 7 for cross-linking the protein shell (20).

In a preferred embodiment, with reference to FIG. 1, a gelatin and carboxymethylcellulose (at a weight ratio of 1:0.1) dispersion (12) is combined with an oil (10) under agitation. The resulting emulsified oil particles are diluted with water at ambient temperature to form a complex coacervate (14) of a gelatin shell around each oil particle, as shown in FIG. 2. The gelatin is stabilized (gelled) and forms a football-shaped shell (16) around the oil (10), as shown in FIG. 3, by decreasing the temperature of the complex coacervate (14) at a rate of approximately 1° C. per five minutes, first to about 20° C. to about 27° C., and then rapidly decreasing the temperature to about 5° C.–10° C. Each protein-encapsulated oil particle (18) is approximately 100–300 microns. The gelled gelatin shell is then cross-linked with transglutaminase at a pH of approximately 7 to form a thermostable capsule (20), as shown in FIG. 4. The transglutaminase is then deactivated by adjusting the capsules (20) to a pH of approximately less than 3 with citric acid. This deactivation step enhances the stability of the capsules (20) and eliminates any gel formation upon storage.

EXAMPLE

Deionized water, prewarmed to 50° C., is used for all gum/gelatin solutions. Carboxymethylcellulose sodium salt (1.8631 g) and gum arabic RCC powder (0.1863 g) are added to water (91.1038 g) with vigorous agitation until completely dissolved. The dispersion is cooled to 35° C. to 40° C. Gelatin 250 bloom type A (18.6306 g) is mixed with deionized water (167.6758 g) under agitation until completely dissolved, then the dispersion is cooled to 35° C. to 40° C. With no agitation, the gum dispersion is added to the pre-emulsion tank and foam is allowed to dissipate for 15–20 minutes. A defoamer may be used if necessary.

A solution of 50%$^{w/w}$ sodium hydroxide or 50%$^{w/w}$ citric acid is added to deionized water (558.9196 g) in the encapsulation tank and is heated to 35° C. to 40° C. Agitation is restarted in the pre-emulsion tank. The desired flavor oil (149.0451 g) is slowly added to the combined gelatin/gum solution in the pre-emulsion tank and is mixed until the oil droplets are at the desired size. The pH is adjusted to pH 5.0 to pH 5.6. The pre-emulsion mixture is transferred to the dilution water in the encapsulation tank and is slowly cooled to 25° C. at the rate of 1° C. per five minutes. The batch is then quickly cooled from 25° C. to 10° C. and adjusted to pH 7 with sodium hydroxide.

Transglutaminase, 10% active in dextrin (0.23288 g), is slowly added to the batch. The batch is agitated for 16 hours at 10° C. Agitation is then stopped and capsules are allowed to separate by floating. Approximately 48–50% of the water is drained from the bottom of the vessel, then agitation is resumed and the concentrated capsules are redispersed. A 10%$^{w/w}$ sodium benzoate solution (10.2469 g) is added to the capsules as a preservative. After thorough mixing, the batch is adjusted to pH 2.75 with 50% citric acid then mixed for 5–10 minutes. A solution of xanthan gum (0.1% to 0.3%) and propylene glycol (0.2% to 0.6%) is slowly added to the mixing capsules to stabilize and control the viscosity of the capsules. Mixing is continued for 30 minutes.

What is claimed is:

1. A method of protein-encapsulating oil particles by complex coacervation comprising:

forming a dispersion in water of at least one positively charged protein colloid and at least one negatively charged colloid;

adding an oil to said dispersion and agitating to form a coarse emulsion of oil particles;

first forming a complex coacervate at ambient temperature;

cooling said complex coacervate to a gel temperature in the range of about 20° C. to about 27° C. to deposit a stabilized protein shell around said oil particles and further cooling to a temperature in the range of about 5° C. to 10° C. to stabilize said protein-encapsulated oil particles over a pH range of about pH 2 to about pH 10; and enzymatically cross-linking said stabilized protein shell to form said protein-encapsulated oil particles.

2. The method of claim 1 wherein said positively charged protein colloid is selected from the group consisting of a gelatin and an agar.

3. The method of claim 2 wherein amount of said gelatin is about 10% by weight.

4. The method of claim 1 wherein said negatively charged colloid is selected from the group consisting of carboxymethylcellulose, sodium hexametaphosphate, gum arabic, and combinations thereof.

5. The method of claim 1 wherein said coarse emulsion particles are about 100 microns to about 2,000 microns.

6. The method of claim 1 wherein said cooling of said complex coacervate is at a rate of about 1° C. per five minutes.

7. The method of claim 1 wherein said complex coacervate is maintained at a temperature in the range of about 5° C. to about 10° C. for a time sufficient to ensure stabilization.

8. The method of claim 1 wherein said enzymatic cross-linking comprises:

adjusting a pH of said complex coacervate to about pH 7; and adding a transglutaminase to said complex coacervate to cross-link said protein shell of said particles.

9. The method of claim 8 wherein said transglutaminase is selected from the group consisting of naturally occurring, chemically synthesized, and recombinantly produced transglutaminase.

10. The method of claim 8 wherein said transglutaminase is about 1% to about 10% by weight in a carrier.

11. The method of claim 10 wherein said carrier is selected from the group consisting of dextrin, sodium caseinate, and sugar.

12. The product of the method of claim 1 having flavor oil particles encapsulated in a protein shell having a particle size of about 100 microns to about 300 microns and which are fracturable to provide a burst of flavor upon chewing.

13. The method of claim 1 wherein said enzymatic crosslinking is by adding a transglutaminase.

14. The method of claim 1 wherein said enzymatic crosslinking occurs at a pH 7 of said complex coacervate.

15. The method of claim 1 wherein said protein-encapsulated oil particles are thermostable.

16. The method of claim 1 wherein said oil is a flavor oil.

17. A method of microencapsulating oil particles in an enzymatically cross-linked protein shell comprising:

forming an aqueous dispersion of a gelatin and a carboxymethylcellulose;

emulsifying an oil with said gelatin and said carboxymethylcellulose dispersion under agitation to form emulsified oil particles;

diluting said emulsified oil particles at ambient temperature with water to form a complex coacervate of a gelatin shell around each of said oil particles;

cooling said complex coacervate to a gel temperature in the range of about 20° C. to about 27° C. to deposit a protein shell around each of said oil particles and further cooling to a temperature in the range of about 5° C. to 10° C. to stabilize said protein-encapsulated oil particles over a pH range of about pH 2 to pH 10;

cross-linking said gelled gelatin shell at said temperature at a pH of about 7 with transglutaminase to form a microcapsule; and deactivating said transglutaminase by adjusting to a pH of approximately less than 3 to enhance stability and eliminate gel formation upon storage of said microcapsule.

18. The method of claim 17 wherein said temperature decrease from said ambient temperature to said temperature of about 20° C. to about 27° C. is at a rate of about 1° C. per five minutes.

19. The method of claim 17 wherein said pH is adjusted to approximately less than 3 with citric acid.

20. The method of claim 17 wherein said gelatin and said carboxymethylcellulose are in a one:one-tenth ratio.

21. The product of the method of claim 17 having flavor oil particles encapsulated in a protein shell having a particle size of about 100 microns to about 300 microns and which are fracturable to provide a burst of flavor upon chewing.

* * * * *